(No Model.)
B. C. HICKS.
CHAIN FOR STOCK CAR PARTITIONS.
No. 401,274. Patented Apr. 9, 1889.
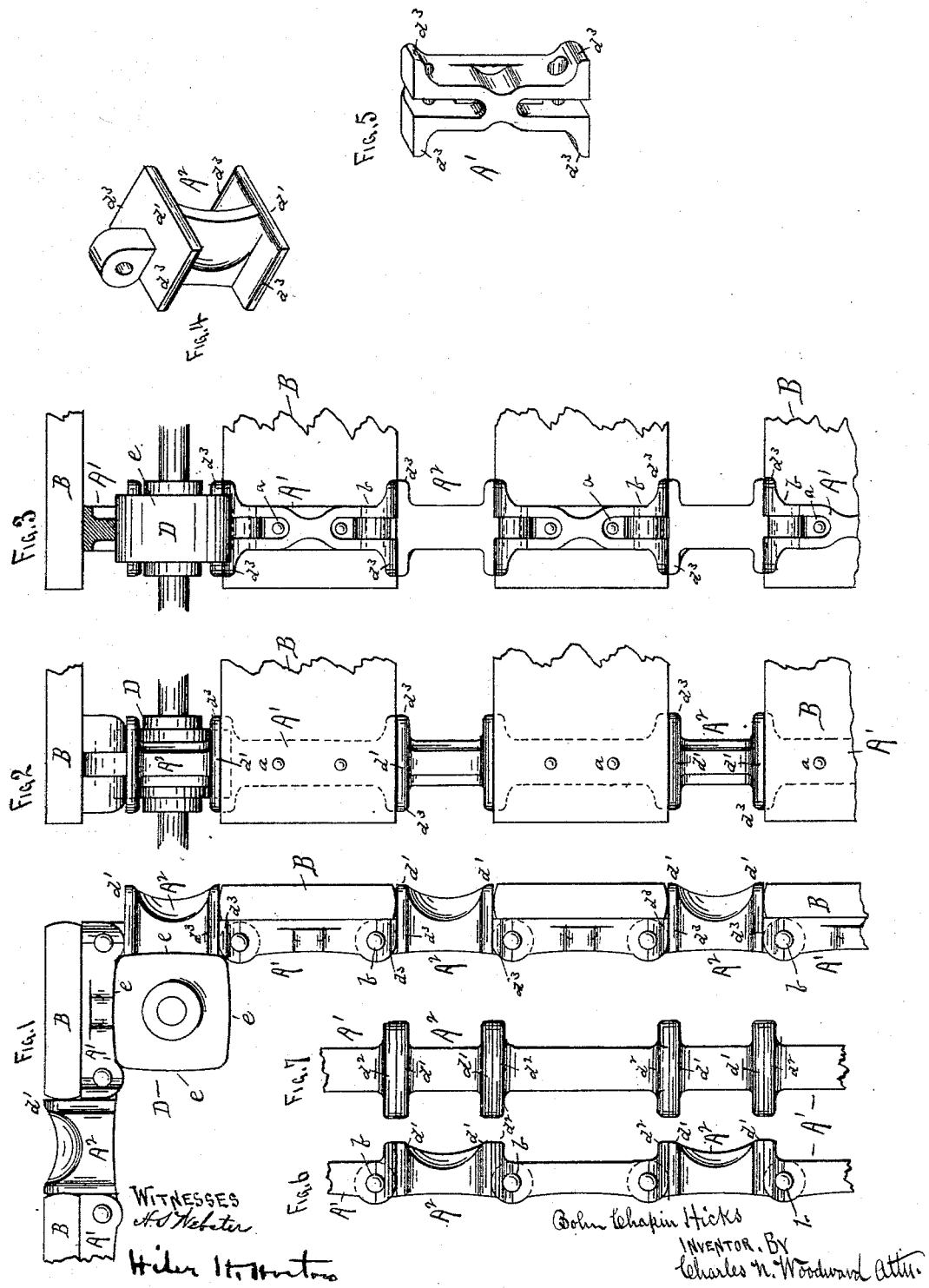

UNITED STATES PATENT OFFICE.

BOHN CHAPIN HICKS, OF MINNEAPOLIS, MINNESOTA.

CHAIN FOR STOCK-CAR PARTITIONS.

SPECIFICATION forming part of Letters Patent No. 401,274, dated April 9, 1889.

Application filed January 18, 1889. Serial No. 296,755. (No model.)

*To all whom it may concern:*

Be it known that I, BOHN CHAPIN HICKS, a citizen of the United States, residing at Minneapolis, in the county of Hennepin and State of Minnesota, have invented certain new and useful Improvements in Chains for the Flexible Partitions of Stock-Cars, of which the following is a specification.

This invention relates to chains, more particularly to that class of chains employed in connecting the slats of the flexible partitions in stock-cars, but which may also be applied to other purposes, and for the purpose of illustration I have shown it in the drawings employed to secure the slats of one of the above-mentioned flexible partitions.

In the drawings, Figure 1 represents a side view of a portion of one of the chains with the slats attached. Fig. 2 is a view of the same from the outer side of the belt, and Fig. 3 is a view from the inner side of the belt. Figs. 4 and 5 are detached perspective views of one of each form of the links. Figs. 6 and 7 are views similar to Figs. 1 and 2, showing slight modifications in the construction.

$A'$ represents the links, to which the slats B are secured by bolts or rivets $a$, while intermediate links, $A^2$, connect the links $A'$ at their adjacent ends by pins $b$. The ends of the links are rounded on one side, so that they are free to turn backward in one direction to secure the necessary flexibility, but are prevented from bending in the other direction by stops $d'$, which rest upon the edge of the slats B when the chains are used in connection with the slats or by stops $d^2$ on the links $A'$, as in Figs. 6 and 7, the stops $d^2$ and the edges of the slats thus having analogous functions to this extent. The stops $d^2$ might also be employed on the same link with the slats B, if required; but generally the edges of the slats will be utilized as stops to prevent the links moving beyond a straight line in one direction. Each of the links $A'$ $A^2$ will also be provided with stops $d^3$ $d^3$ on their sides, so that broad bearing-surfaces will be provided at each side to receive the side strains and prevent them coming entirely upon the pins $b$, while at the same time effectually preventing said movement and retaining the chains in an inflexible position sidewise.

The joint between the links will be close fitting, so that no end play can occur, and if the chain is supported from the curved sides of the joints it will be inflexible, as it cannot bend from the opposite side.

This form of chain will be found very useful in many locations and for many purposes, but will be found especially applicable in forming the flexible partitions in stock-cars. When used in this connection, and also in many others, the chains will be arranged to run over a peculiarly-formed pulley, D, the form of this pulley being one of the novel and important features of my invention. In chains of this class the links are longer than in ordinary chains, and if used over ordinary sheaves or sprocket-wheels would require wheels of such large size as to render its use impracticable in many locations; but to avoid this objection I form the carrying-wheel D with four sides, each side with convex curves $e$ in segments of circles having radii much longer than the radius of the wheel itself, and with the free sides of the links $A'$ $A^2$ correspondingly concaved, so that as the chain is drawn over the sheaves D it will roll over the convex surfaces with no more friction than when an ordinary chain is rolling over an ordinary sheave. By this simple arrangement chains with long links can be employed in locations heretofore possible only for chains with short links, and is therefore a very important advantage. It will be found of especial advantage, as before stated, for use in connection with the flexible partitions of stock-cars which are to be run up in close proximity to the roofs of the cars when not in use.

Having thus described my invention, what I claim as new is—

1. A chain formed of links with their adjacent ends coupled together and curved on one side, and with stops on their other sides, whereby it is flexible in one direction and rigid in the other, substantially as and for the purpose set forth.

2. A chain formed of links with their adjacent ends coupled together and curved on one side, and with stops $d'$ $d^2$ $d^3$ on their other sides, whereby it is flexible in one direction and rigid in the other, substantially as and for the purpose set forth.

3. A chain formed of links coupled by their ends, in combination with a carrier-sheave over which said chain is adapted to be drawn, and having sides corresponding to the length of said links, said sides and links being curved in segments of circles whose radii are in excess of the radius of said sheave, whereby a sheave of small diameter may be employed to carry a chain having long links, substantially as and for the purpose set forth.

In testimony whereof I have hereunto set my hand in the presence of two subscribing witnesses.

BOHN CHAPIN HICKS.

Witnesses:
C. N. WOODWARD,
H. S. WEBSTER.